United States Patent
Ryan

(10) Patent No.: US 7,237,670 B1
(45) Date of Patent: Jul. 3, 2007

(54) TRANSVERSE-ROLLER BELT CONVEYOR

(75) Inventor: Robert S. Ryan, Lansdale, PA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 11/459,261

(22) Filed: Jul. 21, 2006

(51) Int. Cl.
*B65G 17/24* (2006.01)

(52) U.S. Cl. .................................. 198/779; 198/370.09

(58) Field of Classification Search ............... 198/779, 198/370.09, 370.1, 371.3
See application file for complete search history.

(56) References Cited

U.S. PATENT DOCUMENTS

| | | |
|---|---|---|
| 3,550,756 A | 12/1970 | Kornylak |
| 3,679,043 A | 7/1972 | Becker |
| 3,828,917 A | 8/1974 | Oestergren |
| 4,039,074 A | 8/1977 | Maxted |
| 4,231,469 A | 11/1980 | Arscott |
| 5,238,099 A | 8/1993 | Schroeder et al. |
| 5,240,102 A | 8/1993 | Lucas |
| 5,769,204 A | 6/1998 | Okada et al. |
| 6,073,747 A | 6/2000 | Takino et al. |
| 6,494,312 B2 | 12/2002 | Costanzo |
| 6,568,522 B1 | 5/2003 | Boelaars |
| 6,681,922 B2 | 1/2004 | Corley et al. |
| 6,968,941 B2 | 11/2005 | Fourney |
| 6,997,306 B2 | 2/2006 | Sofranec et al. |
| 7,021,454 B2 | 4/2006 | Ozaki et al. |
| 2006/0070854 A1* | 4/2006 | Boelaars ............... 198/779 |
| 2006/0070855 A1 | 4/2006 | Lemm |
| 2006/0070857 A1* | 4/2006 | Fourney ............... 198/779 |

FOREIGN PATENT DOCUMENTS

JP          03-088617 A       4/1991

* cited by examiner

*Primary Examiner*—James R. Bidwell
(74) *Attorney, Agent, or Firm*—James T. Cronvich

(57) ABSTRACT

A conveyor having a conveyor belt with article-supporting rollers selectively rotated to direct conveyed articles toward one side of the conveyor or the other. The belt rollers are arranged in longitudinal columns and can rotate on axes parallel to the direction of belt travel. Salient portions of the belt rollers protrude through the thickness of the belt. An array of powered rollers, each powered roller underlying a column of belt rollers, is selectively moved into and out of contact with the belt rollers to cause them to rotate to direct articles conveyed atop the belt rollers toward or off one side of the conveyor when the conveyor belt is stopped.

6 Claims, 6 Drawing Sheets

TRANSVERSE-ROLLER BELT CONVEYOR

BACKGROUND

The invention relates to power-driven conveyors generally and, more particularly, to conveyors transferring articles off the sides of modular plastic conveyor belts with article-supporting rollers rotated by contact with powered rollers.

Many conveying applications require that articles be moved laterally across a conveying surface transverse to the general conveying direction. Singulators and laners are examples of two kinds of conveyors in which articles are moved laterally across the conveyor into specific locations. Other conveying applications require that articles be transferred off the side of a conveyor to another conveyor or to a staging area. A sorter is one example of this kind of transfer conveyor. Because conveyor belts are less noisy and easier to maintain than powered roller conveyors, belts are used as the article-conveying medium in many of these applications. Conveyed articles are moved laterally by, for example, external pusher bars or internal shoes programmed to translate across the conveying surface and push the conveyed articles. Sweeper rails extending obliquely across the conveying surface are also used to sweep articles toward one side of the conveyor belt as it advances. But these schemes require contact between a pushing surface and the sides of the conveyed articles, which can be scuffed, scratched, or otherwise marred by the pushing surface.

Thus, there is a need for a belt conveyor that can translate articles laterally across a conveying surface.

SUMMARY

This need and other needs are satisfied by a belt-conveyor embodying features of the invention. According to a first aspect of the invention, a conveyor comprises a conveyor belt having laterally spaced first and second sides defining the width of the conveyor belt and outer and inner faces defining the thickness of the conveyor belt. Belt rollers extend through the thickness of the conveyor belt. Salient portions of the belt rollers protrude past the outer and inner faces. A conveyor belt drive selectively stops and advances the conveyor belt in a direction of belt travel along a carryway. The belt rollers are arranged to rotate on axes parallel to the direction of belt travel. Powered rollers underlie the conveyor belt along the carryway and are selectively movable into and out of contact with the salient portions of the belt rollers protruding past the inner face of the conveyor belt. The powered rollers rotate on axes parallel to the direction of belt travel to rotate the belt rollers by contact.

According to another aspect of the invention, a method for moving conveyed articles laterally across a conveyor belt comprises: (a) selectively stopping and advancing a conveyor belt along a carryway in a direction of belt travel, wherein the conveyor belt has article-supporting belt rollers extending through the thickness of the conveyor belt and arranged to rotate on axes parallel to the direction of belt travel; and (b) moving a plurality of powered rollers rotating on axes parallel to the direction of belt travel into contact with the belt rollers on the carryway when the conveyor belt is stopped to rotate the belt rollers to push conveyed articles laterally across the conveyor belt.

BRIEF DESCRIPTION OF THE DRAWINGS

These aspects and features of the invention, as well as its advantages, are better understood by reference to the following description, appended claims, and accompanying drawings, in which:

DETAILED DESCRIPTION

Figure 1:
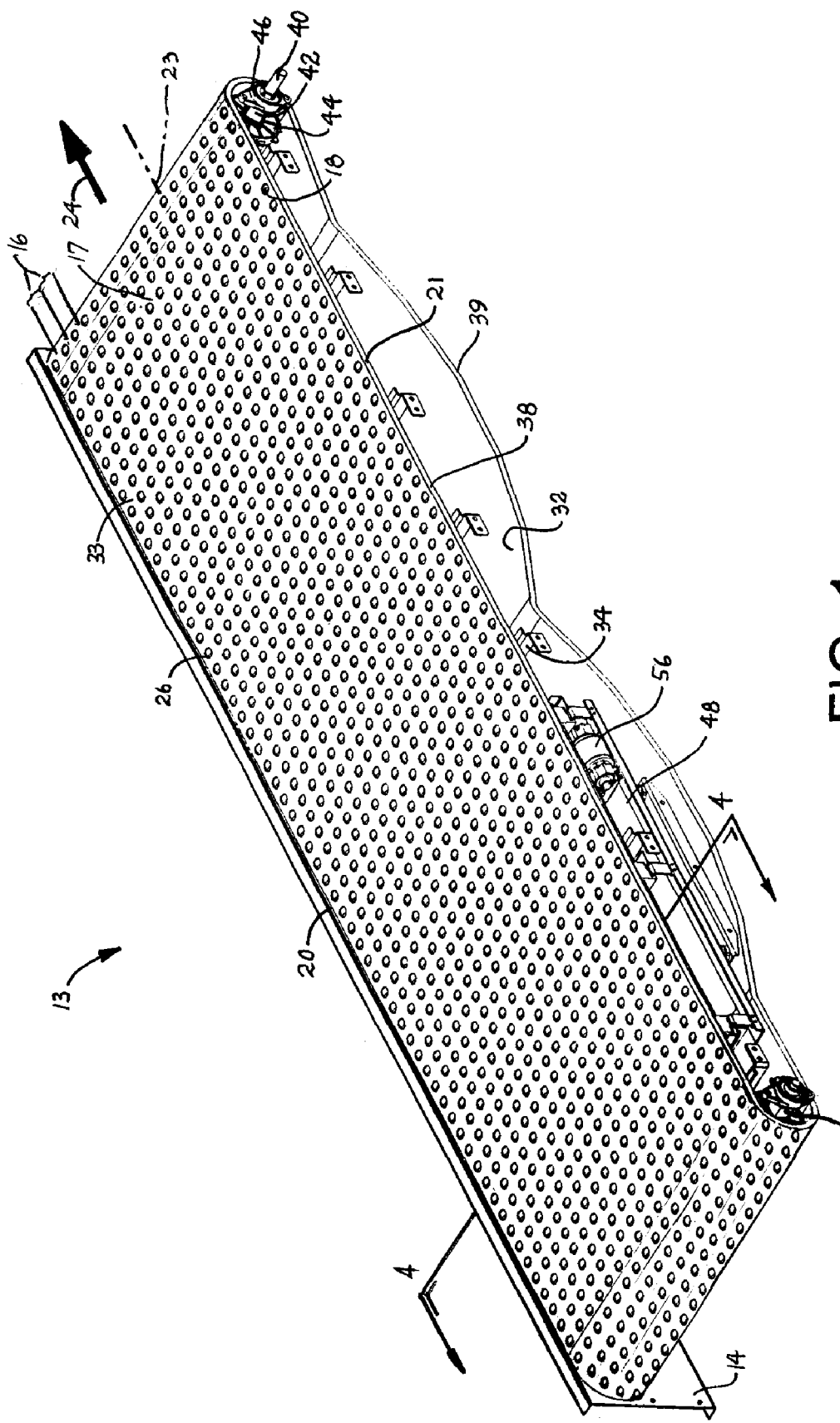
FIG. 1 is an isometric view of a roller-belt conveyor embodying features of the invention with a side frame removed from the figure for clarity.
Figure 2:
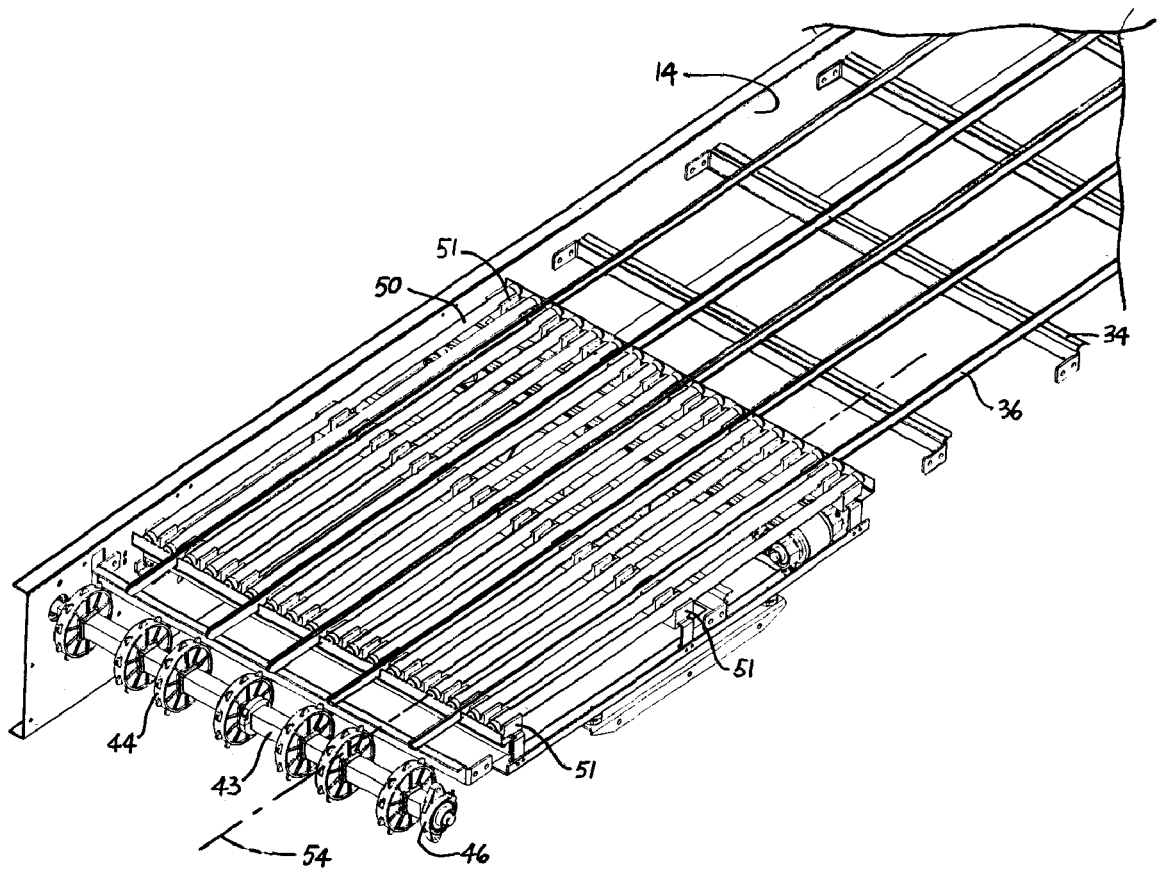
FIG. 2 is an isometric view of an upstream portion of the conveyor of FIG. 1 with the roller belt removed to show a powered roller mechanism.
Figure 3:
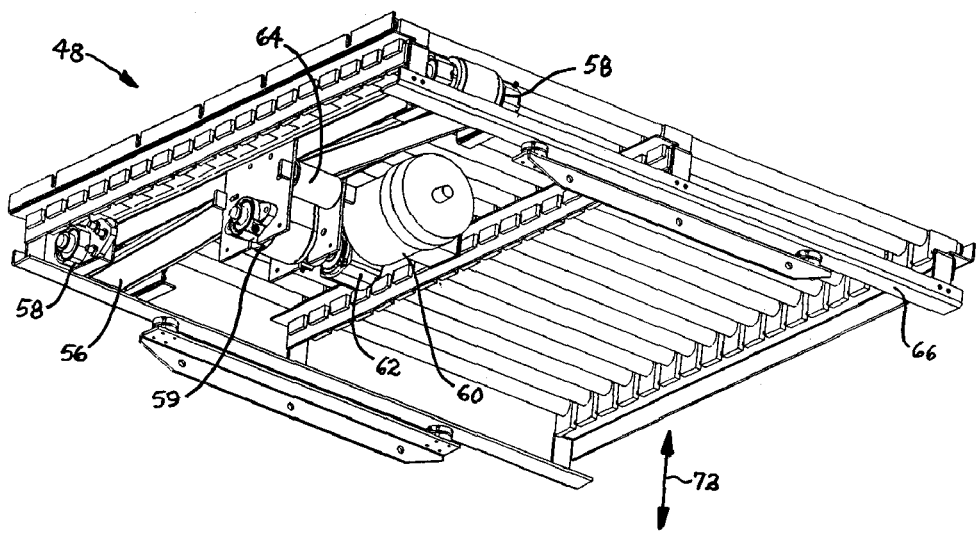
FIG. 3 is view of the powered roller mechanism of FIG. 2 from below.
Figure 4:
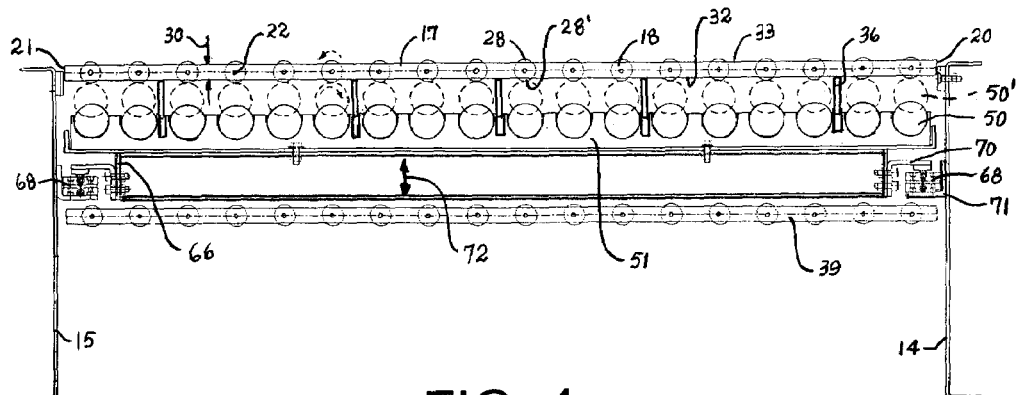
FIG. 4 is an elevation cross section of the conveyor of FIG. 1 taken along lines 4—4 of FIG. 1 and including both side frames.

A conveyor embodying features of the invention is shown in FIGS. 1–5. The conveyor 13 includes a conveyor belt 17 supported in a frame having two side rails 14, 15. The conveyor belt is a roller-top belt having longitudinal columns 16 of rollers 18 spaced apart laterally across the width of the belt between opposite first and second sides 20, 21. The rollers are mounted in the conveyor belt on axles 22 defining axes of rotation 23 parallel to the direction of belt travel 24. The ends of the axles are supported in the belt. Each axle may be fixed in place across a belt cavity 26 with the roller receiving the axle in a central bore and rotating on the axle. Alternatively, each roller may be affixed to an axle or have axle stubs extending from opposite sides with the ends of the stubs rotatably retained in holes in opposite sides of the cavity's wall. Salient portions 28, 28' protrude through the thickness 30 of the conveyor belt past inner and outer faces 32, 33 of the belt loop. The belt is preferably a modular plastic conveyor belt constructed of a series of rows of one or more injection-molded thermoplastic modules connected end to end by hinge rods at hinge joints between consecutive rows into an endless belt loop. But the belt could be a metal belt or a flexible flat belt.

Cross members 34 attached at opposite ends to the side rails 14, 15 of the conveyor frame support the conveyor belt atop wear strips 36 along an upper carryway 38. A belt drive 40, including a drive shaft 42, sprockets 44, bearing blocks 46, a drive motor 41, a gear box 45, a transmission chain 47, and chain sprockets 49, advances the belt along the carryway in the direction of belt travel. The conveyor belt returns along a lower returnway 39. An idle sprocket set mounted on an idle shaft 43 supported by bearing blocks transitions the conveyor belt from the returnway back to the carryway. The wear strips 36 are positioned laterally between the columns of rollers 18 to support the conveyor belt along the carryway directly on the belt's inner face 32.

A powered roller mechanism 48 engages the belt rollers 18 along a portion of the carryway and causes them to rotate on their axes. The roller mechanism includes an array of powered rollers 50 supported at their ends and in the middle on stationary bearings 51. The powered rollers rotate on axes 54 parallel to the direction of belt travel. The powered rollers are preferably made of a metallic core covered by frictional material, such as polyurethane, but could also be knurled metal or an elastomeric material. The powered rollers are driven in FIGS. 1–5 by a flat belt 56 beneath the rollers. The powered rollers are supported on the top surface of the flat belt, which loops around pulleys 58 at each side of the conveyor. The belt is center driven in the return by a drive motor 60 coupled to a drive pulley 59 through a gearbox 62. The belt bends around tensioning rollers 64 at the entrance to and the exit from the drive pulley. As the flat belt advances, its frictional contact with the powered rollers causes them to rotate. In this bi-directional drive, the direction of rotation of the powered rollers is reversed by reversing the direction of rotation of the motor.

Each of the powered rollers 50 underlies one of the columns 16 of belt rollers. When the powered rollers are in contact with the belt rollers, the rotation of the powered rollers causes the belt rollers to rotate. In this way, an article conveyed atop the conveyor belt 12 is directed to one side of the belt or the other. The powered roller mechanism is mounted on a frame 66 that is coupled to the conveyor side rails 14, 15 by lifts 68 mounted between first brackets 70 on the powered roller frame and second brackets 71 on the conveyor side rails. The lifts are pneumatic, hydraulic, or electromechanical devices that can be activated to expand to lift the powered rollers into contact with the belt rollers as indicated by the rollers 50' in broken lines in FIG. 4. When activated, the powered rollers lift the conveyor belt slightly above the tops of the wearstrips 36. When deactivated, the lifts contract to lower the powered rollers 50 out of engagement with the belt rollers. The conveyor belt is supported on the wearstrips when the powered rollers are lowered. In this way, the lifts can be alternately activated and de-activated to move the powered rollers up and down as indicated by two-headed arrow 72, into and out of contact with the belt rollers.

Figure 5:
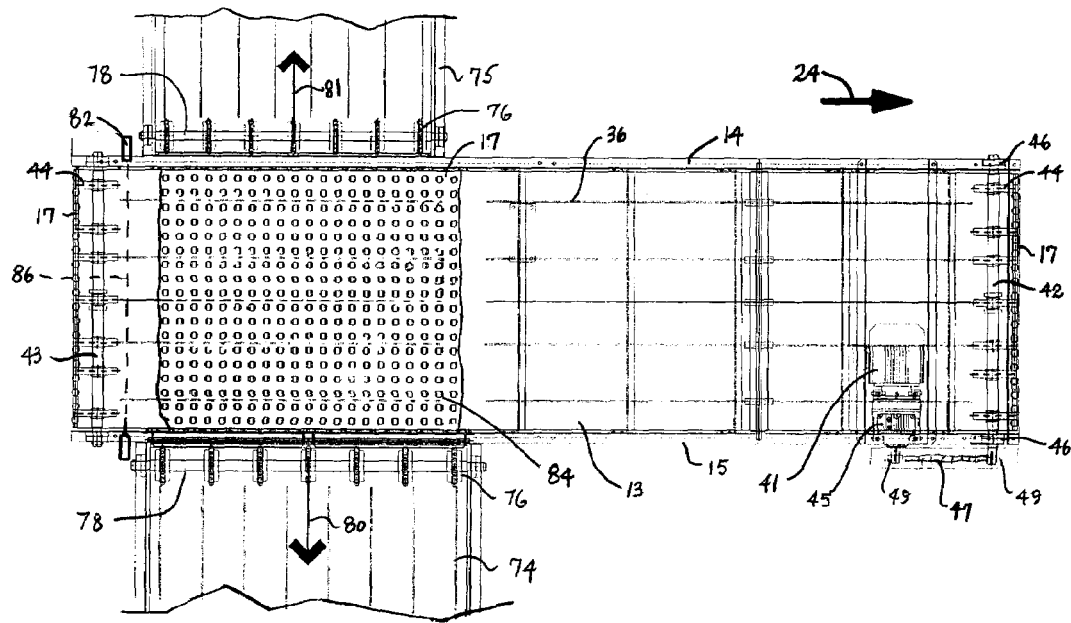
FIG. 5 is a top plan view, partly cut away, of the conveyor of FIG. 1, further including take-away conveyors.
Figure 6:
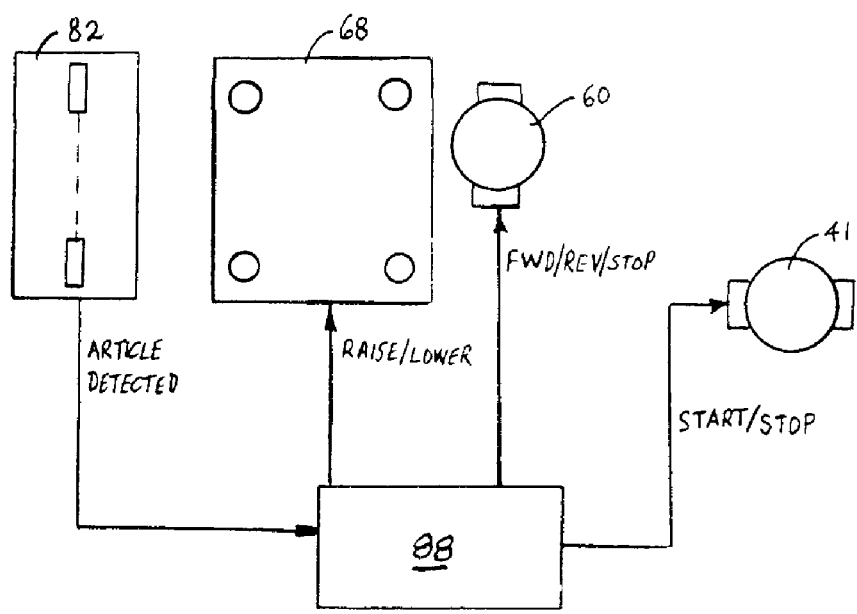
FIG. 6 is a block diagram of control system for the conveyor of FIG. 1.

Conveyed articles can be directed toward one side of the conveyor belt or the other through selective activation of the belt rollers. And, as shown in FIG. 5, articles may be transferred off either side of the conveyor belt onto take-away conveyors 74, 75 abutting the main conveyor 13 at each side. The take-away conveyors may be belt conveyors, as shown, with belts trained between drive (not shown) and idler sprockets 76 mounted on idle shafts 78 and driven in the direction of arrows 80, 81 to transport conveyed articles away from the main conveyor. Alternatively, the take-away conveyors can be gravity-roller conveyors or powered-roller conveyors for example. A sensor 82 senses the presence of a conveyed article on or approaching a roller-activation zone 84, or transfer region, of the main conveyor. If, for example, an optical sensor including a photo emitter and a photo detector positioned just upstream of the transfer region has its beam 86 broken by an advancing article, the photodetector sends an ARTICLE DETECTED signal to a controller 88, such as programmable logic controller or other computer or logic device, as shown in FIG. 6. When the article finally clears the beam and the ARTICLE DETECTED signal changes state, the controller sends a FWD (forward) or REV (reverse) signal to the powered-roller motor 60 to rotate the belt rollers to push articles toward the first take-away conveyor 74 or the second 75, as appropriate. The powered-roller motor is preferably soft-started, ramping up to full speed in about 0.7 seconds. The controller also sends a RAISE signal to the lifts 68 to raise the powered rollers into contact with the belt rollers and a STOP signal to the conveyor belt motor 41 to halt the belt's advance while the rollers are rotating. Once the article has been transferred off the main conveyor, the controller sends a LOWER signal to the lifts, a STOP to the powered-roller motor, and a START signal to the conveyor belt motor to advance the next article. Of course, similar logic could be used to translate articles toward one side of the conveyor belt or the other without transferring them off the sides to take-away conveyors. And, for articles destined for the downstream end, the conveyor belt is not stopped and the powered-roller mechanism remains lowered so as not to divert the articles off the sides.

Figure 7:
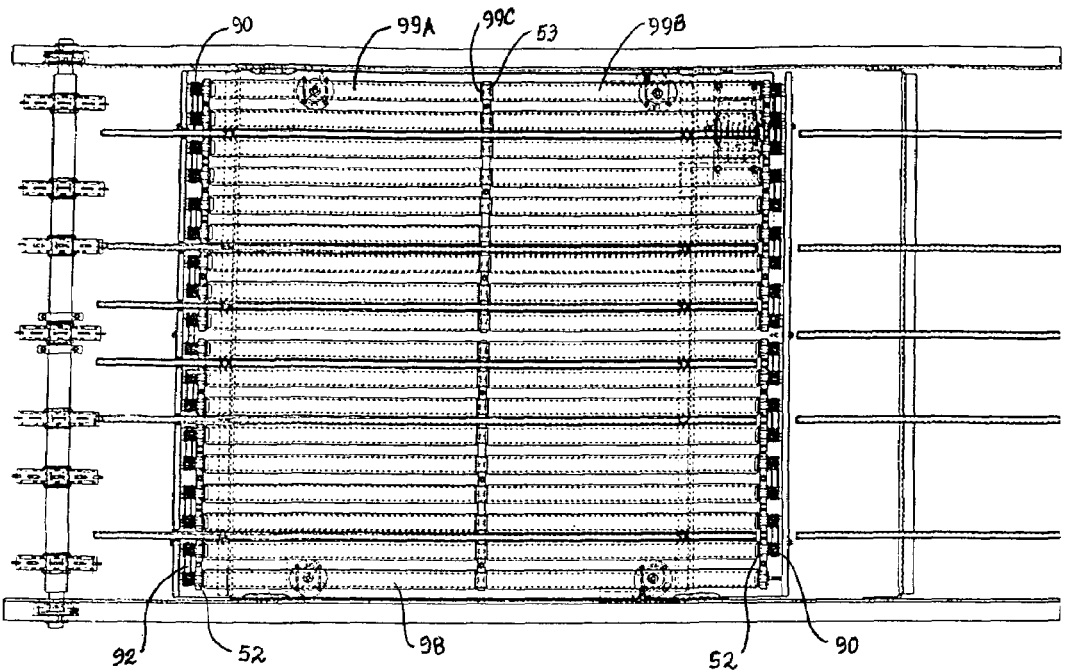
FIG. 7 is a top plan view of a transfer portion of a conveyor as in FIG. 1, but with a different version of powered roller drive using gear pulleys and gear belts.
Figure 8:
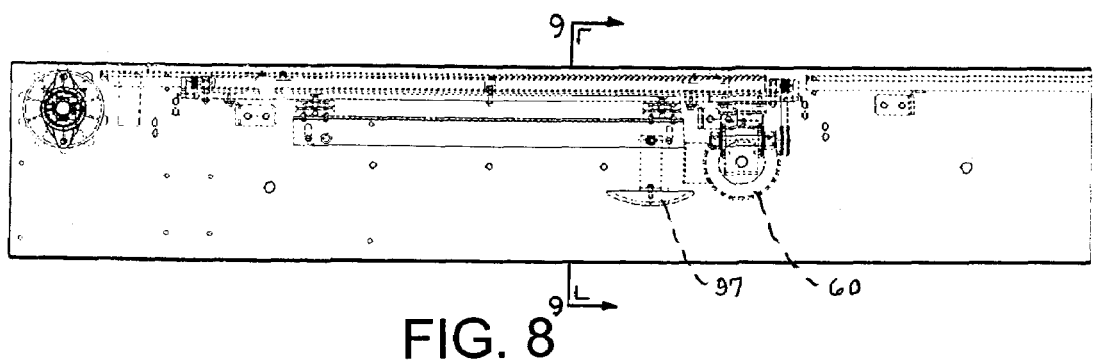
FIG. 8 is a side elevation view of the conveyor of FIG. 7.
Figure 9:
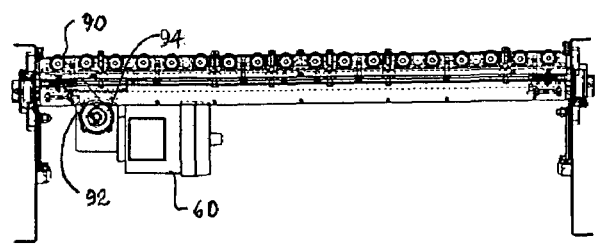
FIG. 9 is a front elevation cross section taken along lines 9—9 of FIG. 8.

Another version of the powered roller drive is shown in FIGS. 7–9. In this version, the powered rollers 98 have toothed gear pulleys 90 at each end of their shafts just outside end bearings 52. Toothed gear belts, or timing belts, 92 are trained between the pulleys of consecutive powered rollers in a serial daisy chain with the gear belts joining consecutive rollers, alternating between the opposite ends of the powered-roller array. The motor 60 is geared to an end of one of the rollers by a gear belt 92 trained around a motor pulley 94 and the roller pulley 90. The motor could alternatively be positioned nearer the middle of the rollers with two gear belts around its pulley: one to drive the rollers under one half of the belt and the other to drive the rollers under the other half of the belt in the same or opposite directions. Unlike the rollers in FIG. 2, these powered rollers 98 include two long full-diameter segments 99A and 99B and a short central narrow-diameter segment 99C retained by a middle roller bearing 53. Shoes 97 suspended below the roller array at each side of the conveyor prevent the conveyor belt from hitting the rollers and the motor.

Figure 12:
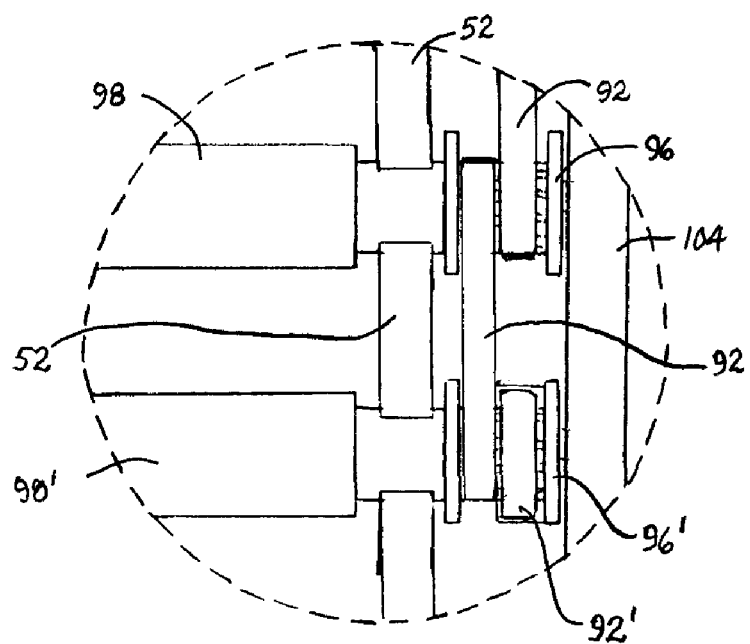
FIG. 12 is an enlarged view of the ends of two consecutive powered rollers in the drive of FIG. 10.
Figure 10:
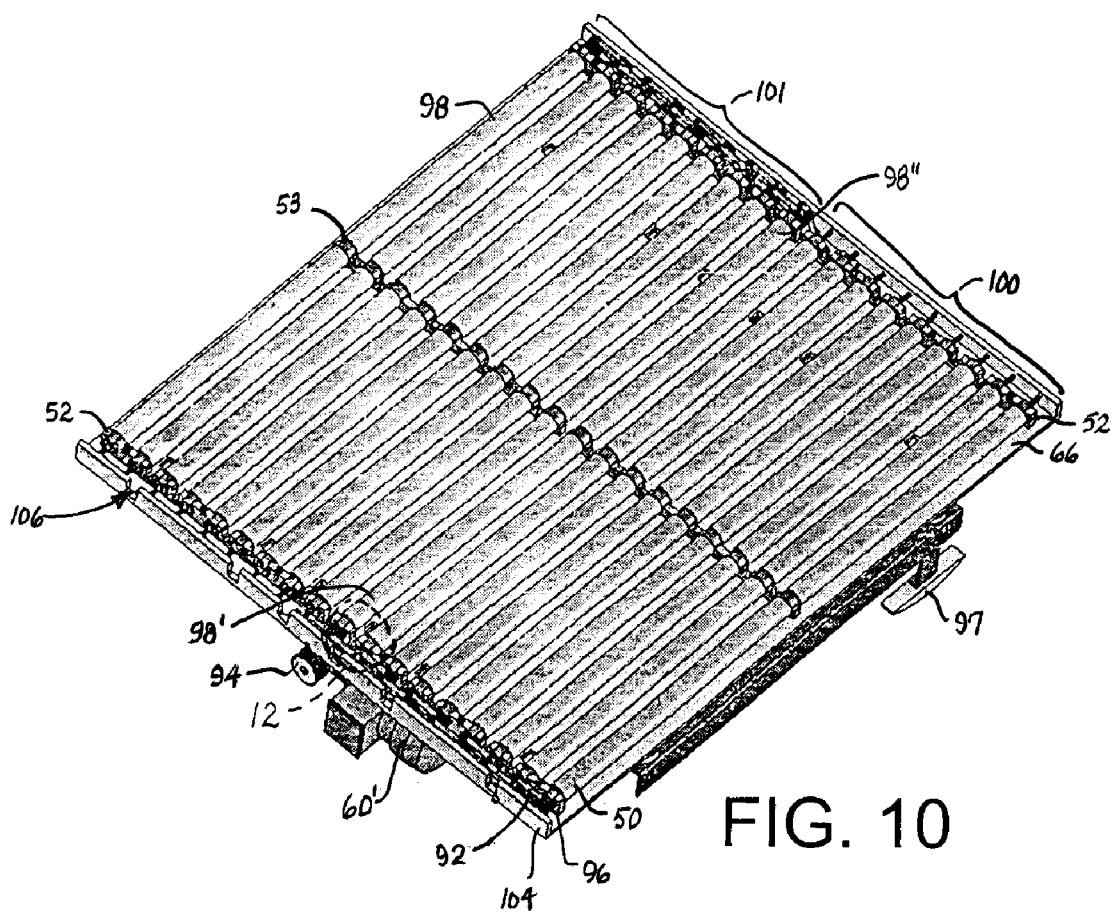
FIG. 10 is a top isometric view of a another version of a powered roller drive as in FIG. 7, but using two motors.
Figure 11:
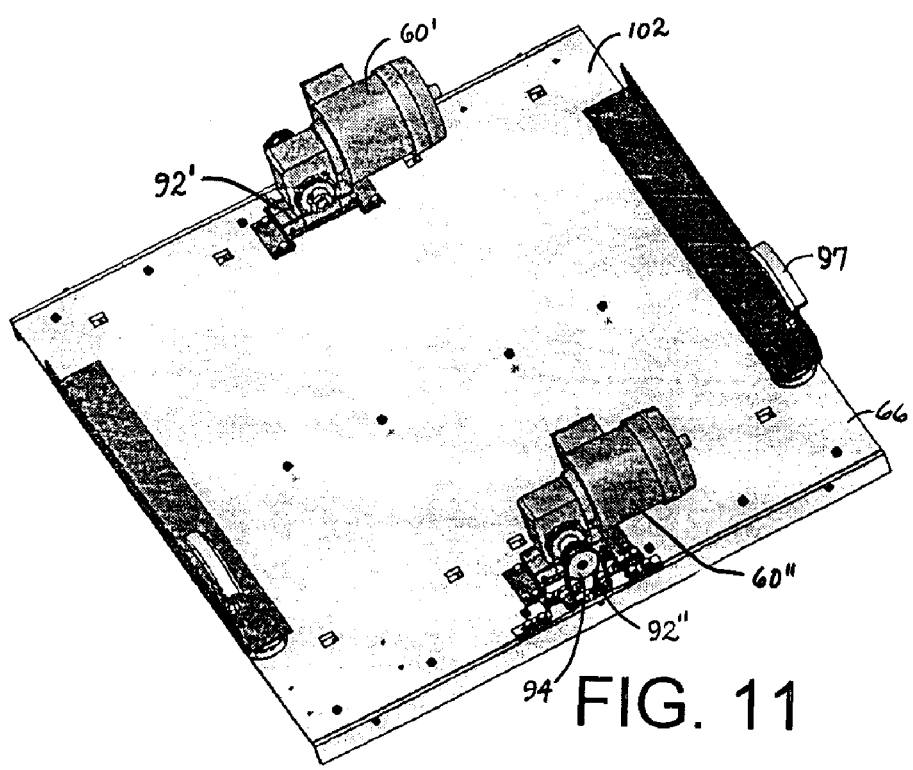
FIG. 11 is a bottom isometric view of the powered roller drive of FIG. 10.

A slightly different version of a powered roller drive is shown in FIGS. 10–12. In this version, a first motor 60' has its gear belt 92' trained between the motor pulley 94 and a double-wide roller gear pulley 96' at the end of an innermost roller 98' of a first set 100 of consecutive rollers 98 on one half of the conveyor. The gear pulleys 96 at the same ends of consecutive rollers of the first set are coupled by gear belts 92. A second motor 60" is similarly coupled to a second set 101 of consecutive rollers on the other half of the conveyor by its gear belt 92" wrapped around the pulley of an innermost roller 98". This two-motor configuration may be used, for example, with unidirectional motors to direct articles on each side of the conveyor belt toward or off the nearer side edge for bi-directional operation. The rollers and motors are mounted to a plate 102 having end flanges 104 for rotatably supporting the ends of the roller shafts. Notches 106 in the end flanges admit the carryway wearstrips. The one-piece rectangular mounting plate makes it easier to machine mounting holes in precise positions for accurate and repeatable placement of the powered rollers. The mounting plate also facilitates drop-in placement in existing conveyor frames.

Although the invention has been described with reference to a few preferred versions, other versions are possible. For example, sensors could be positioned to detect the transfer of articles off the side of the conveyor and signal the controller to deactivate the powered roller mechanism and resume advancing the conveyor belt. And the simplified control scheme described with reference to FIG. 6 to exemplify the operation of the conveyor could be made more sophisticated with more sensors and more intelligence to improve throughput and avoid errors. As another example, not all columns of belt rollers need to be contacted directly by a powered roller; only some columns have to be contacted, with those not contacted rolling by contact with conveyed articles being pushed by the contacted belt rollers. So, as these few examples suggest, the scope of the claims is not meant to be limited to the details of the preferred versions.

What is claimed is:

1. A conveyor comprising:
   a conveyor belt having laterally spaced first and second sides defining the width of the conveyor belt, outer and inner faces defining the thickness of the conveyor belt, and a plurality of belt rollers extending through the thickness of the conveyor belt with salient portions of the belt rollers protruding past the outer and inner faces;
   a conveyor belt drive selectively stopping and advancing the conveyor belt in a direction of belt travel along a carryway;
   wherein the belt rollers are arranged to rotate on axes parallel to the direction of belt travel;
   a plurality of powered rollers underlying the conveyor belt along the carryway and selectively movable into and out of contact with the salient portions of the belt rollers protruding past the inner face of the conveyor belt, wherein the powered rollers rotate on axes parallel to the direction of belt travel to rotate the belt rollers by contact when the conveyor belt is stopped.

2. A conveyor as in claim 1 wherein the belt rollers are arranged in laterally spaced columns across the width of the conveyor belt and wherein the powered rollers are laterally spaced to coincide with the laterally spaced columns of belt rollers.

3. A conveyor as in claim 1 wherein a first portion of the powered rollers underlying the conveyor belt inward from the first side rotates in a direction to rotate the belt rollers to push conveyed articles toward the first side and wherein a second portion of the powered rollers underlying the conveyor belt inward from the second side rotates in an opposite direction to rotate the belt rollers to push conveyed articles toward the second side.

4. A conveyor as in claim 1 comprising a bi-directional roller drive coupled to the plurality of powered rollers to selectively rotate the powered rollers in either direction.

5. A method for moving conveyed articles laterally toward a side of a conveyor belt, the method comprising:
   selectively stopping and advancing a conveyor belt along a carryway in a direction of belt travel, wherein the conveyor belt has article-supporting belt rollers extending through the thickness of the conveyor belt and arranged to rotate on axes parallel to the direction of belt travel;
   moving a plurality of powered rollers rotating on axes parallel to the direction of belt travel into contact with the belt rollers on the carryway when the conveyor belt is stopped to rotate the belt rollers to move conveyed articles laterally across the conveyor belt.

6. The method of claim 5 comprising moving the plurality of powered rollers out of contact with the belt rollers when the conveyor belt is advancing in the direction of belt travel.

* * * * *